(12) United States Patent
Gu

(10) Patent No.: US 11,731,597 B2
(45) Date of Patent: Aug. 22, 2023

(54) VEHICLE BRAKING CONTROL METHOD AND SYSTEM, VEHICLE AND COMPUTER-READABLE STORAGE MEDIUM

(71) Applicant: Robert Bosch GmbH, Stuttgart (DE)

(72) Inventor: Wenhao Gu, Jiangsu (CN)

(73) Assignee: Robert Bosch GmbH, Stuttgart (DE)

( * ) Notice: Subject to any disclaimer, the term of this patent is extended or adjusted under 35 U.S.C. 154(b) by 310 days.

(21) Appl. No.: 17/080,022

(22) Filed: Oct. 26, 2020

(65) Prior Publication Data

US 2021/0129811 A1 May 6, 2021

(30) Foreign Application Priority Data

Oct. 31, 2019 (CN) .......................... 201911052482.4

(51) Int. Cl.
*B60T 8/1755* (2006.01)
*B60L 7/18* (2006.01)
*B60T 8/171* (2006.01)

(52) U.S. Cl.
CPC .............. *B60T 8/1755* (2013.01); *B60L 7/18* (2013.01); *B60T 8/171* (2013.01); *B60T 2250/03* (2013.01); *B60T 2250/04* (2013.01); *B60T 2270/613* (2013.01)

(58) Field of Classification Search
CPC .... B60T 8/1755; B60T 8/171; B60T 2250/03; B60T 2250/04; B60T 2270/613; B60L 7/18
See application file for complete search history.

(56) References Cited

U.S. PATENT DOCUMENTS

| 9,242,624 | B2* | 1/2016 | Huennekens | B60T 17/22 |
| 2001/0006306 | A1* | 7/2001 | Kagawa | B60T 8/4081 |
| | | | | 303/3 |
| 2017/0297548 | A1* | 10/2017 | Baehrle-Miller | F16D 65/18 |
| 2020/0148208 | A1* | 5/2020 | Choi | B60W 10/196 |
| 2021/0001728 | A1* | 1/2021 | Lee | B60W 30/18127 |
| 2021/0122248 | A1* | 4/2021 | Seo | B60L 7/18 |
| 2022/0144338 | A1* | 5/2022 | Scheuerell | B60T 8/1755 |

FOREIGN PATENT DOCUMENTS

| DE | 10 2016 120 745 A1 | | 5/2018 | | |
| EP | 3532354 B1 | * | 1/2022 | ........... | B60K 7/0007 |
| GB | 2483477 A | * | 3/2012 | ............... | B60K 1/04 |
| WO | WO-2018186284 A1 | * | 10/2018 | ............ | B60L 3/0015 |

* cited by examiner

*Primary Examiner* — Peter D Nolan
*Assistant Examiner* — Tanya C Sienko
(74) *Attorney, Agent, or Firm* — Maginot, Moore & Beck LLP

(57) ABSTRACT

A vehicle braking control method includes activating an electronic parking brake system on a vehicle to perform a braking operation; checking whether a rear wheel unlock braking activation condition is met during the braking operation, and if it is met, acquiring a current vehicle stability characteristic. The method further includes determining whether the acquired vehicle stability characteristic is within a preset range; if it is, using motive power supplied by an electric machine on the vehicle together with a rear wheel unlock braking system to execute the braking operation, otherwise executing the braking operation with the rear wheel unlock braking system.

12 Claims, 1 Drawing Sheet

VEHICLE BRAKING CONTROL METHOD AND SYSTEM, VEHICLE AND COMPUTER-READABLE STORAGE MEDIUM

This application claims priority under 35 U.S.C. § 119 to patent application no. CN 2019 1105 2482.4, filed on Oct. 31, 2019 in China, the disclosure of which is incorporated herein by reference in its entirety.

The disclosure relates to the technical field of vehicles, in particular to a vehicle braking control method, a vehicle braking control system, a vehicle and a computer-readable storage medium.

BACKGROUND

At present, Electronic Parking Brake (EPB) systems are configured on many vehicles, to enable parking braking by electronic control when necessary during travel. However, in some situations, for example when an ESP (Electronic Stability Program) on the vehicle develops a fault and a parking brake actuating mechanism (such as a hydraulic braking system) is consequently unable to operate normally, the driver can at this time take the initiative to activate an EPB button to perform braking, i.e. brake the vehicle by means of a Rear Wheel Unlock (RWU) function. However, rear wheel braking in existing vehicles can generally only provide kinetic energy of deceleration of 0.15 g-0.25 g (g being the acceleration due to gravity), and the entire service life of this kind of RWU function is generally only 5 times at most; moreover, braking stability is poor, and the braking effect is also poor. This has resulted in the deficiencies mentioned above for example in practical applications.

SUMMARY

In view of the above, the disclosure provides a vehicle braking control method, a vehicle braking control system, a vehicle and a computer-readable storage medium, by which it is possible to resolve or at least mitigate one or more of the abovementioned problems in the prior art and other problems.

Firstly, according to a first aspect of the disclosure, it provides a vehicle braking control method, comprising the steps of:

activating an electronic parking brake system on a vehicle to perform a braking operation;

checking whether a rear wheel unlock braking activation condition is met during the braking operation, and if it is met, acquiring a current vehicle stability characteristic; and determining whether the acquired vehicle stability characteristic is within a preset range; if it is, using motive power supplied by an electric machine on the vehicle together with a rear wheel unlock braking system to execute a braking operation, otherwise executing a braking operation by means of the rear wheel unlock braking system.

The vehicle braking control method according to the disclosure optionally further comprises the step of: subjecting the acquired vehicle stability characteristic to numerical grading, and determining the magnitude of motive power supplied by the electric machine according to a result of the numerical grading.

In the vehicle braking control method according to the disclosure, optionally, the vehicle stability characteristic is acquired according to a current running parameter of the vehicle, the running parameter comprising wheel speed, longitudinal vehicle acceleration, transverse vehicle acceleration and body yaw rate.

In the vehicle braking control method according to the disclosure, optionally, the running parameter further comprises a brake lamp switch signal.

In the vehicle braking control method according to the disclosure, optionally, a determination is made as to whether the vehicle stability characteristic is within the preset range by means of at least one control unit on the vehicle, the control unit comprising ESP, VCU, HCU and DCU.

In the vehicle braking control method according to the disclosure, optionally, the motive power is a regenerative braking force generated by the electric machine charging a power storage means on the vehicle.

In the vehicle braking control method according to the disclosure, optionally, the vehicle comprises a pure electric vehicle or a hybrid vehicle.

Secondly, according to a second aspect of the disclosure, it provides a vehicle braking control system, comprising:
a memory, configured to store an instruction; and
a processor, configured to implement any one of the above variants of the vehicle braking control method when the instruction is executed.

In addition, according to a third aspect of the disclosure, it provides a vehicle, comprising an electronic parking brake system, the vehicle further comprising the vehicle braking control system as described above.

Furthermore, according to a fourth aspect of the disclosure, it provides a computer-readable storage medium for storing an instruction which, when executed, implements any one of the above variants of the vehicle braking control method.

Using the technical solution of the disclosure, full use can be made of motive power of the electric machine on the vehicle to assist the rear wheel unlock braking system to complete a vehicle braking control operation, thereby successfully resolving problems such as insufficient deceleration capability, short service life and poor stability, which are widely present in existing rear wheel unlock braking systems, so vehicle safety and reliability can be significantly enhances. The disclosure is highly practical and can be applied at a low cost, so has outstanding value in terms of promotability and applicability.

DETAILED DESCRIPTION

Figure 1:
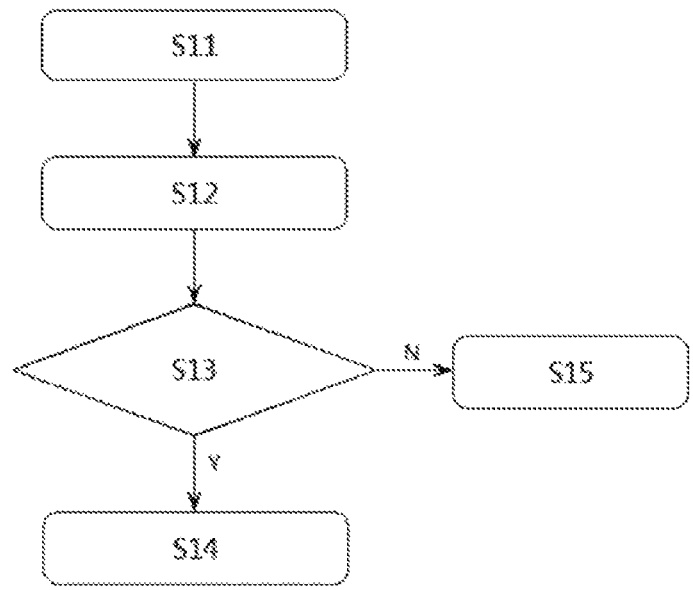
FIG. 1 is a schematic flow chart of a vehicle braking control method embodiment.
Figure 2:
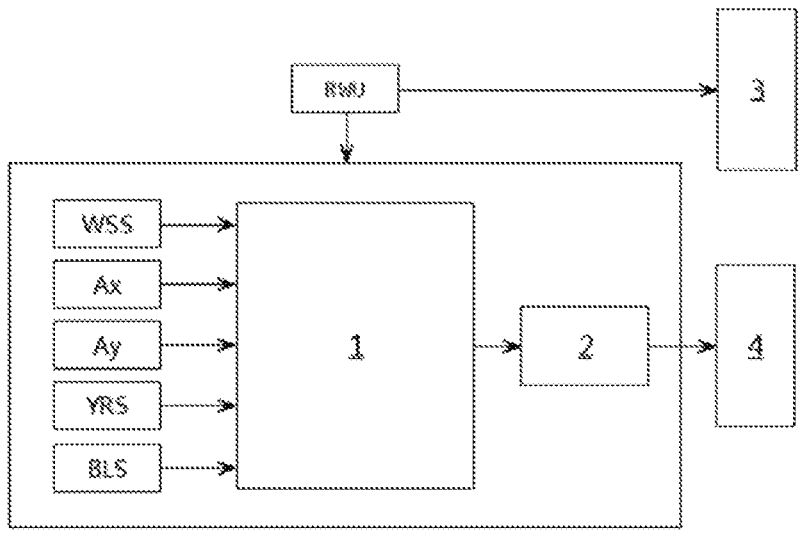
FIG. 2 is a schematic diagram of the operating principles of the vehicle braking control method embodiment shown in FIG. 1.

FIGS. 1 and 2 illustrate the general procedure and the operating principles respectively of a vehicle braking control method embodiment according to the disclosure; the technical solution of the disclosure is explained demonstratively below by means of these two illustrated examples.

Referring to FIGS. 1 and 2, the vehicle braking control method embodiment provided may comprise the following steps:

Firstly, in step S11, when a vehicle (e.g. a pure electric vehicle, hybrid vehicle, etc.) needs to perform parking braking in the course of travel, an operator of the vehicle (e.g. driver, automatic driving system, etc.) can use an electronic parking brake (EPB) system installed on the vehicle to perform a corresponding braking operation on the vehicle. For example, if the driver discovers, after depressing the brake pedal of the vehicle, that no corresponding deceleration of the vehicle occurs—this might be due to a fault having occurred in an ESP or hydraulic braking system on the vehicle for example, or another reason—then the driver can manually activate an EPB button disposed in the cab to request that the electronic parking brake system complete the vehicle braking operation. Of course, in some scenarios, the electronic parking brake system might also be activated automatically by a vehicle operator such as an automatic driving system, based on the current vehicle state, road conditions in the vicinity, or other considerations.

Next, in step S12, when the electronic parking brake system has been activated to perform a braking operation, a check can be performed to determine whether the vehicle meets a rear wheel unlock braking activation condition at this time. If it is found, by checking, that the activation condition is met, then a current vehicle stability characteristic (e.g. various parameters used to characterize a vehicle running attitude, etc.) is acquired, and this may for example be obtained by detecting a current running parameter of the vehicle and performing calculation processing; such running parameters may include but are not limited to wheel speed, longitudinal vehicle acceleration, transverse vehicle acceleration and body yaw rate. As an example for illustration, a wheel speed V, longitudinal vehicle acceleration Ax, transverse vehicle acceleration Ay, body yaw rate YRS and brake lamp switch signal BLS are shown in FIG. 2 in the form of a block diagram only; the vehicle stability characteristic can be obtained by subjecting these to calculation processing. It should be explained that the brake lamp switch signal BLS mentioned above serves as an optional parameter, which may be used to speed up the process of calculation processing, and is therefore permitted to be omitted in some embodiments. All of the other running parameters mentioned above may be collected by means of corresponding sensors, processors, control modules or units, etc. disposed on the vehicle; for example, the wheel speed V may be detected by means of a wheel speed sensor.

In addition, in the method of the disclosure, it is also possible to use a vehicle stability characteristic processing apparatus with various types of sensor and/or processor, etc. already integrated therein, in order to obtain the required vehicle stability characteristic therefrom directly. Once the vehicle stability characteristic has been obtained, it may be used to determine whether electric machine motive power can be used in combination to implement a braking operation; this will be described in greater detail below.

Regarding the rear wheel unlock braking activation condition mentioned above, different vehicle manufacturers and different vehicle types might have identical or not completely identical settings; since this portion of technical content falls within the scope of prior art, is understood and known not only by those skilled in the art, and is not a focal point of the solution of the disclosure, it is not described further herein.

As shown in FIG. 1, in step S13, a further determination can be made as to whether the current stability characteristic of the vehicle obtained via step S12 above is within a preset range; the preset range may be flexibly set, chosen and adjusted, etc. according to various actual application requirements. For example, an attitude characteristic in a normal stationary state when the vehicle is on level ground may be used as a reference attitude characteristic, and then +2% to −2%, +5% to −5%, +8% to −8%, +10% to −10% of deviation from the reference attitude characteristic or any other range of suitable values may be used as the preset range mentioned above, which is used to evaluate whether the degree of deviation between the current state of the vehicle stability characteristic and the reference state mentioned above is within a permissible range, and it is thereby possible to determine whether it is appropriate to use electric machine motive power in combination to implement a braking operation. That is, if the current vehicle stability characteristic has already exceeded the preset range, then this indicates that the degree of stability of the vehicle at this time is poor, and electric machine motive power cannot be used easily; otherwise, if electric machine motive power were to be additionally inputted for the braking operation, this would be highly likely to cause further loss of stability of the vehicle, thereby affecting or even seriously endangering travel safety at this time.

Continuing to refer to FIGS. 1 and 2, if it is determined through the above determination that the current vehicle stability characteristic is still within the preset range thereof, then motive power supplied by an electric machine 4 installed on the vehicle may be used in step S14, e.g. the motive power may be applied directly to a front axle of the vehicle to generate a braking force, which is used together with a rear wheel unlock braking system 3 to execute a braking operation. In this way, it is possible to effectively supplement braking kinetic energy for the vehicle, powerfully assisting the rear wheel unlock braking system to complete a vehicle braking operation more effectively, easing the higher performance requirements on rear wheel unlock braking systems, and thereby successfully resolving problems such as insufficient deceleration kinetic energy, very short service life and poor stability and reliability, which are widely present in existing rear wheel unlock braking systems. Purely as an example for illustration, actual measurement data from some application scenarios has demonstrated that deceleration kinetic energy of 0.1 g-0.3 g for example can be provided by an electric machine on a vehicle, and when this is used in combination with a rear wheel unlock braking system, deceleration kinetic energy reaching 0.25 g-0.55 g for example can be provided; this will be able to significantly increase the overall braking capability of the vehicle, effectively shortening the time needed for braking operations, and reducing the braking distance.

Of course, in the opposite case to that described above, if it is determined through the above determination that the current vehicle stability characteristic has already exceeded the preset range thereof, then a braking operation can be executed by means of the rear wheel unlock braking system 3 in step S15, i.e. there is no need for motive power supplied by the electric machine 4 to be used in combination, in order to avoid undesirable situations such as loss of vehicle stability and accidents arising at this time due to electric machine motive power being inputted inappropriately to the braking operation.

It must be explained that although the abovementioned electric machine motive power can be supplied directly by a running electric machine, in an optional scenario, the electric machine motive power may also use a braking force of recovery of kinetic energy that is recovered and stored in a power storage means (such as a capacitor) on the vehicle; that is to say, a regenerative braking force generated by the electric machine on the vehicle charging a power storage means of this type during vehicle travel may be used. That is, when the rear wheel unlock braking system 3 performs a braking operation, the regenerative braking force is supplied synchronously by the running electric machine 4, and this also helps to achieve more effective recycling of energy. Of course, if a situation occurs where a battery cannot be charged due to the power storage means having an excessively high state of charge or developing a fault, etc., then the abovementioned kinetic energy recovery operation cannot be activated, in which case motive power directly outputted by the electric machine can be used as a braking force.

The vehicle braking control method of the disclosure has been explained demonstratively above by means of the examples of FIGS. 1 and 2 alone, but it should be understood that in order to be able to better satisfy various application scenarios, the method of the disclosure is absolutely permitted to undergo any suitable improvements and amendments.

For example, in some embodiments, the current stability characteristic of the vehicle obtained in step S12 may further be subjected to numerical grading, and then the magnitude of motive power that can be supplied by the electric machine is determined according to the result of this numerical grading; this is shown schematically in FIG. 2 by means of an optional processing module 2. As an example for illustration, the magnitude of electric machine motive power than can be supplied may be determined according to the numerical size of the numerical grading result; for example, when the numerical grading result is 0.2, then 20% (or another suitable value) of maximum recovered torque can on this basis be allocated and inputted to a current braking operation of the vehicle, instead of inputting all of the currently available motive power of the electric machine to the vehicle braking operation at this time. Regarding a corresponding value processing method of numerical grading, the prior art has already provided many feasible methods, therefore those skilled in the art are perfectly capable of making a choice for application according to actual application requirements, and so this is not discussed further herein.

As another example, in some embodiments, the collection/calculation processing of current running parameters of the vehicle, the calculation processing of vehicle stability characteristics and analysis/determination, etc. may be accomplished separately or arbitrarily in combination by means of one or more control units 1 disposed on the vehicle; such control units 1 may include but are not limited to ESP (Electronic Stability Program), VCU (Vehicle Control Unit), HCU (Hybrid Control Unit) and DCU (Drive Control Unit) for example. In addition, the abovementioned processing module 2 may not only be realized using an independent chip, processor or other component, but is also permitted to be integrated in the abovementioned control unit 1 directly.

According to the design concept of the disclosure, it also provides a vehicle braking control system, which may comprise a processor and a memory for storing an instruction. When the instruction is executed, the processor in the vehicle braking control system can implement the vehicle braking control method according to the disclosure, in order to exploit the abovementioned obvious technical advantages of the solution of the disclosure.

Furthermore, according to a technical solution of the disclosure, a vehicle is also provided, wherein the vehicle braking control system described above may be configured on the vehicle, to enable it to implement the vehicle braking control solution according to the disclosure discussed above for example, based on an electronic parking brake system already installed on the vehicle. It will be understood that the vehicle according to the disclosure may include but is not limited to numerous types of vehicle such as pure electric vehicles and hybrid vehicles.

In addition, the disclosure also provides a computer-readable storage medium for storing an instruction which, when executed, can implement the vehicle braking control method according to the disclosure. The abovementioned computer-readable storage medium may be a component, module or apparatus of any type that is capable of storing an instruction, and may include but is not limited to, for example, Read Only Memory (ROM), Random Access Memory (RAM) and Erasable Programmable Read Only Memory (EPROM), etc.

What is claimed is:

1. A vehicle braking control method, comprising:
    upon activation of an electronic parking brake system on a vehicle to perform a braking operation, checking whether a rear wheel unlock braking activation condition is met during the braking operation, and when the rear wheel unlock braking activation condition is met, acquiring a current vehicle stability characteristic;
    determining whether the acquired current vehicle stability characteristic is within a preset range indicating that the vehicle is in a stable condition;
    when it is determined that the acquired current vehicle stability characteristic is within the preset range indicating that the vehicle is in the stable condition, executing the braking operation using motive power supplied by an electric machine of the vehicle together with a rear wheel unlock braking system; and
    when it is determined that the acquired current vehicle stability characteristic is outside of the preset range indicating that the vehicle is in an unstable condition, executing the braking operation with the rear wheel unlock braking system without using motive power supplied by the electric machine.

2. The vehicle braking control method as claimed in claim 1, further comprising:
    numerically grading the acquired current vehicle stability characteristic; and
    determining a magnitude of the motive power supplied by the electric machine according to a result of the numerical grading.

3. The vehicle braking control method as claimed in claim 1, wherein acquiring the current vehicle stability characteristic comprises:
    acquiring the current vehicle stability characteristic according to a current running parameter of the vehicle, wherein the current running parameter comprises at least one of wheel speed, longitudinal vehicle acceleration, transverse vehicle acceleration, and body yaw rate.

4. The vehicle braking control method as claimed in claim 3, wherein the current running parameter further comprises a brake lamp switch signal.

5. The vehicle braking control method as claimed in claim 1, wherein:
    at least one control unit on the vehicle is configured to determine whether the acquired current vehicle stability characteristic is within the preset range, and
    the at least one control unit comprises at least one of an electronic stability program, a vehicle control unit, a hybrid control unit, and a drive control unit.

6. The vehicle braking control method as claimed in claim 1, wherein the motive power is a regenerative braking force generated by the electric machine when charging a power storage device on the vehicle.

7. The vehicle braking control method as claimed in claim 1, wherein the vehicle is a pure electric vehicle or a hybrid vehicle.

8. The vehicle braking control method as claimed in claim 1, wherein:
- a non-transitory computer-readable storage medium is configured to store an instruction, and
- when the instruction is executed by a processor, the processor implements the vehicle braking control method.

9. The vehicle braking control method as claimed in claim 1, wherein the braking operation is a deceleration braking operation to decelerate the vehicle when the vehicle is moving.

10. A vehicle braking control system, comprising:
- a non-transitory computer-readable storage medium configured to store an instruction; and
- a processor operably connected to the storage medium and configured to execute the instruction to implement vehicle braking control of a vehicle, in response to executing the instruction the processor configured to:
  - upon activation of an electronic parking brake system on the vehicle to perform a braking operation, check whether a rear wheel unlock braking activation condition is met during the braking operation, and when the rear wheel unlock braking activation condition is met, to acquire a current vehicle stability characteristic,
  - determine whether the acquired current vehicle stability characteristic is within a preset range indicating that the vehicle is in a stable condition,
  - when the processor determines that the acquired current vehicle stability characteristic is within the preset range indicating that the vehicle is in the stable condition, execute the braking operation using motive power supplied by an electric machine of the vehicle together with a rear wheel unlock braking system, and
  - when the processor determines that the acquired current vehicle stability characteristic is outside of the preset range indicating that the vehicle is in an unstable condition, execute the braking operation with the rear wheel unlock braking system without using motive power supplied by the electric machine.

11. The vehicle braking control system as claimed in claim 10, wherein the vehicle comprises the vehicle braking control system.

12. The vehicle braking control system as claimed in claim 10, wherein the processor is configured to perform the braking operation to decelerate the vehicle.

* * * * *

UNITED STATES PATENT AND TRADEMARK OFFICE
CERTIFICATE OF CORRECTION

| | | |
|---|---|---|
| PATENT NO. | : 11,731,597 B2 | |
| APPLICATION NO. | : 17/080022 | |
| DATED | : August 22, 2023 | |
| INVENTOR(S) | : Gu | |

It is certified that error appears in the above-identified patent and that said Letters Patent is hereby corrected as shown below:

In the Claims

In Claim 10, at Column 8, Line 2: "met, to acquire" should read --met, acquire--.

Signed and Sealed this
Tenth Day of October, 2023

Katherine Kelly Vidal
*Director of the United States Patent and Trademark Office*